United States Patent [19]

Ghosh et al.

[11] Patent Number: 4,672,290
[45] Date of Patent: Jun. 9, 1987

[54] CIRCUIT ARRANGEMENT IN WHICH A CAPACITOR UNIT IS CONNECTED IN SERIES WITH AN A.C. LOAD

[75] Inventors: Shyamal-Krishna Ghosh, Bad Neustadt/Saale; Emil Sturm, Niederlauer, both of Fed. Rep. of Germany

[73] Assignee: Siemens Aktiengesellschaft, Fed. Rep. of Germany

[21] Appl. No.: 881,874

[22] Filed: Jul. 3, 1986

[30] Foreign Application Priority Data

Jul. 26, 1985 [DE] Fed. Rep. of Germany ....... 3526897

[51] Int. Cl.$^4$ ............................................. H02P 1/44
[52] U.S. Cl. .................................... 318/817; 318/816; 320/1
[58] Field of Search ............... 318/816, 817, 729, 794, 318/795; 361/328, 275, 15, 16; 323/370, 324; 307/109, 108, 110, 146; 363/101; 320/1

[56] References Cited

U.S. PATENT DOCUMENTS

| | | | |
|---|---|---|---|
| 3,041,501 | 6/1962 | Willits | 361/16 |
| 3,303,402 | 2/1967 | Martin | 318/795 |
| 3,432,738 | 11/1969 | Jensen | 307/110 |

*Primary Examiner*—David Smith, Jr.
*Attorney, Agent, or Firm*—Jack R. Penrod

[57] ABSTRACT

A circuit arrangement is disclosed in which a capacitive unit suitable for a.c. operation is connected in series with an a.c. load. An extension of the life of the capacitors can be achieved by having the capacitor unit consist of two capacitors connected in series either on the same side of the consumer or on opposite sides of the consumer, and that a separate rectifier diode is connected in parallel with each capacitor. Both rectifier diodes are connected with its forward direction opposite with relation to each other. This prevents reverse polarity voltage and charge, as well as reduces the duty cycle by fifty percent, thereby polarizing electrolytic capacitor life.

2 Claims, 2 Drawing Figures

CIRCUIT ARRANGEMENT IN WHICH A CAPACITOR UNIT IS CONNECTED IN SERIES WITH AN A.C. LOAD

BACKGROUND OF THE INVENTION

This invention relates to a circuit arrangement in which a capacitor unit suitable for a.c. operation is connected in series with an a.c. power load.

Circuit arrangements of this type are generally known as starting circuits for single-phase induction motors. As a rule, polarized electrolytic capacitors are used as starting capacitors, because such capacitors are low in price and can be operated for brief periods with alternating current.

In order to extend the life of these electrolytic capacitors, it is proposed in German Offenlegungsschrift 32 06 187 that the capacitors be switched off as quickly as possible after the motor has been started. In this manner, the capacitors are subjected to a load for only a brief time and is thus protected. Such prompt removal of the capacitors from the circuit after the switching on a single-phase induction motor may, however, have detrimental consequences for the motor. The removal of the starting capacitor reduces the starting torque so that the run-up of the motor will take a longer time, with the result that the motor winding experiences intense heating. Furthermore, disturbances during run-up may occur if the motor is subjected to a varying load.

SUMMARY OF THE INVENTION

It is an object of this invention to provide a capacitor circuit arrangement for series connection with an a.c. load such that the life of the capacitors is prolonged without any risks of either excessive heat up or poor performance under load to the a.c. consuming equipment.

Briefly stated in accordance with one aspect of the invention, the foregoing objects are achieved by providing two capacitors connected in series either on the same side of the consumer or on opposite sides of the consumer equipment, and that a rectifier diode is connected in parallel with each capacitor, said rectifier diodes being connected with their forward directions opposite with relation to each other. Through this arrangement of two capacitors and the parallel connection of rectifier diodes to the capacitors, reversed-polarity charging of the capacitors which leads to intensive heating of the capacitors and thus limits the duty life, is prevented. The rectifier diode connected in parallel with each capacitor shorts the voltage for one half-wave for said capacitor in each cycle, so that the capacitor is always charged only by a half-wave of the same polarity current. By virtue of the fact that both rectifier diodes are connected in parallel with the capacitors and in the opposite sense with relation to each other, one capacitor is charged by the positive half-wave in each cycle and the other capacitor is charged by the negative half-wave in each cycle. As the capacitors are thus no longer charged and discharged according to their polarities, the losses are reduced to the extent that continuous service of the capacitors is possible if desired.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
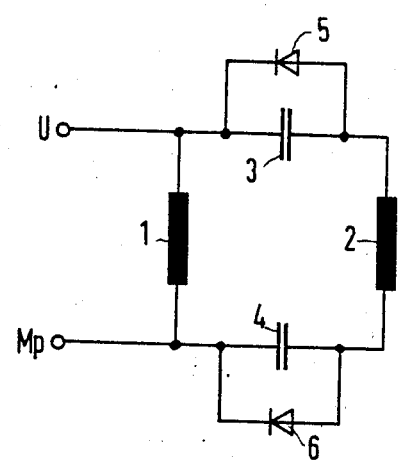
FIG. 1 is a schematic diagram of a circuit arrangement in which the capacitors are connected in series on either side of the auxiliary winding of a single-phase induction motor.

In the circuit arrangement of FIG. 1, the number 1 denotes the main winding of a single-phase induction motor, which is connected to the line terminals U and Mp. In parallel with the main winding 1, a series circuit consisting of the auxiliary winding 2 and two capacitors 3 and 4 is connected to the line terminals U and Mp. In this series circuit, the auxiliary winding 2 is situated between the two capacitors 3 and 4 and thus connects these two capacitors, which have their other leads connected to the line terminals U and Mp respectively. A rectifier diode 5 or 6, respectively, is connected in parallel with capacitors 3 or 4, respectively. The two rectifier diodes 5 and 6 have their forward directions opposite with relation to each other.

Figure 2:
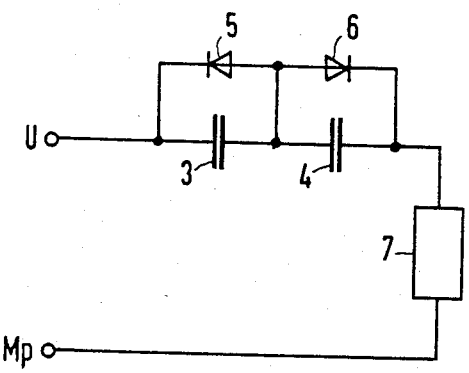
FIG. 2 is a schematic diagram of a circuit arrangement in which the capacitors are directly connected in series with the a.c. load circuit configuration.

FIG. 2 shows a circuit arrangement in which the two capacitors 3 and 4 are in direct series connection and are connected, in series with arbitrary a.c. load 7, to the line terminals U and Mp. Rectifier diode 5 and 6, respectively, are in turn connected in parallel to capacitors 3 and 4. The rectifier diodes 5 and 6 are connected to capacitors 3 and 4 respectively, having their forward directions opposite with relation to each other.

By virtue of the stated manner of parallel connection of the rectifier diodes 5 and 6 to the capacitors 3 and 4, each capacitor is always charged only by a half-wave of the same polarity. During the half-wave of the opposite polarity, the capacitor in question again discharges. In accordance with the illustrations in FIGS. 1 and 2, the capacitor 3 in both sample embodiments is always charged only by the positive half-wave of each cycle of the a.c. voltage. The capacitor 4, in contrast, is shorted by the rectifier diode 6 during the positive half-wave and can discharge through the circuit. During the negative half-wave of the a.c. voltage, on the other hand, capacitor 4 is charged and capacitor 3 is shorted by the rectifier diode. Capacitor 3 can now discharge through the circuit. Both half-waves, in contrast, flow through the auxiliary winding 2 or the consumer 7, which thus carries an alternating current.

As the embodiments show, the capacitors 3 and 4 will always only charge and discharge so that the capacitors 3 and 4 are not charged in reversed polarity. The losses associated with reversed-polarity charging and the resulting heating of the capacitors thus do not take place. In this manner, the life of the capacitors is substantially prolonged and the capacitors can be operated in continuous service.

It will now be understood that there has been disclosed an improved system for connecting polarized electrolytic capacitors to an a.c. load. As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A circuit arrangement having a capacitive unit for a.c. operation connected in series with an a.c. load comprising:

two capacitors as part of said capacitive unit, connected in series on the same side of said a.c. load; and a rectifier diode connected in parallel with each of said capacitors respectively and the rectifier diodes having the forward direction opposite with relation to each other.

2. A circuit arrangement having a capacitive unit for a.c. operation connected in series with an a.c. load comprising:

two capacitors as part of said capacitive unit, connected in series on opposite sides of said a.c. load; and a rectifier diode connected in parallel with each of said capacitors respectively and the rectifier diodes having the forward direction opposite with relation to each other.

* * * * *